United States Patent [19]

Zaguroli, Jr.

[11] Patent Number: 5,549,192
[45] Date of Patent: Aug. 27, 1996

[54] RETURN MECHANISM FOR GRAVITY CONVEYOR

[75] Inventor: James Zaguroli, Jr., Drayton Plains, Mich.

[73] Assignee: Knight Industries, Inc., Auburn Hills, Mich.

[21] Appl. No.: 381,499

[22] Filed: Jan. 31, 1995

[51] Int. Cl.⁶ .................................................. B65G 35/08
[52] U.S. Cl. ........................................ 198/795; 198/803.2
[58] Field of Search ..................... 198/580, 795, 198/800, 803.01, 803.2

[56] References Cited

U.S. PATENT DOCUMENTS 4,934,515  6/1990  Linden .................................. 198/803.2
5,141,100  8/1992  Lampus et al. ......................... 198/795

FOREIGN PATENT DOCUMENTS 0211082   2/1960   Germany ................................ 198/795
2646755   4/1977   Germany ................................ 198/795
0223608  12/1984   Japan ..................................... 198/795
0722806   3/1980   U.S.S.R. ................................ 198/795

*Primary Examiner*—James R. Bidwell
*Attorney, Agent, or Firm*—John R. Benefiel

[57] ABSTRACT

A drive mechanism for driving roller supported trolleys around a radiused track to the upper end of a gravity conveyor, in which one or more rotating rod assemblies each having a spring loaded plunger which is retracted as the rod assembly rotates across a trolley and is extended into a recess in the top of the trolley to establish a driving contact. The trolley is then swept around the radiused track by rotation of the rod assembly.

5 Claims, 3 Drawing Sheets

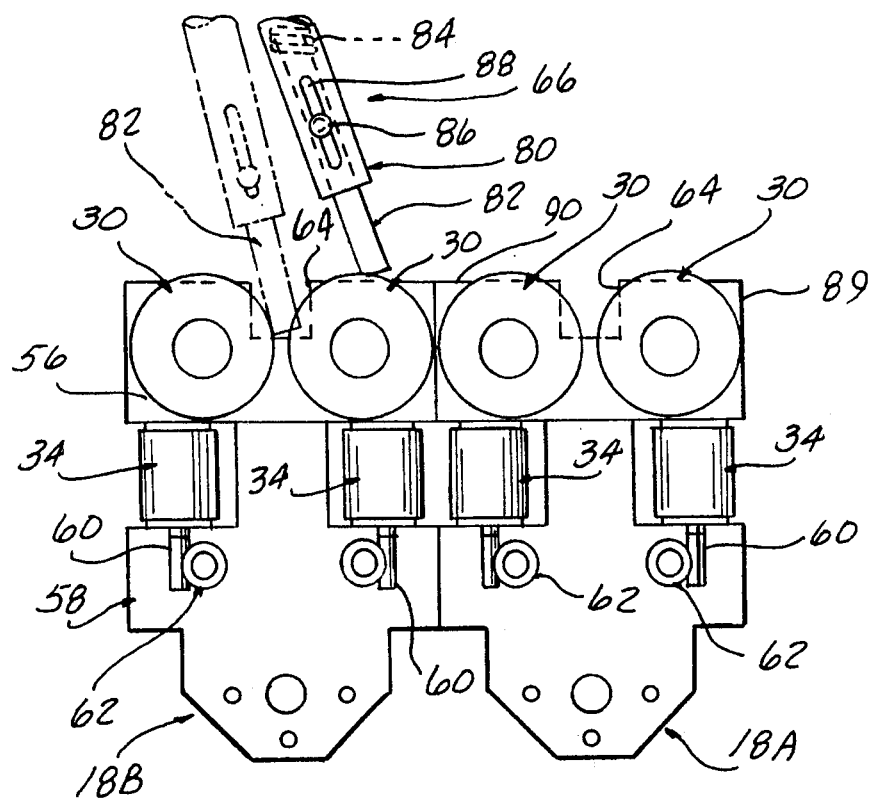
FIG-4
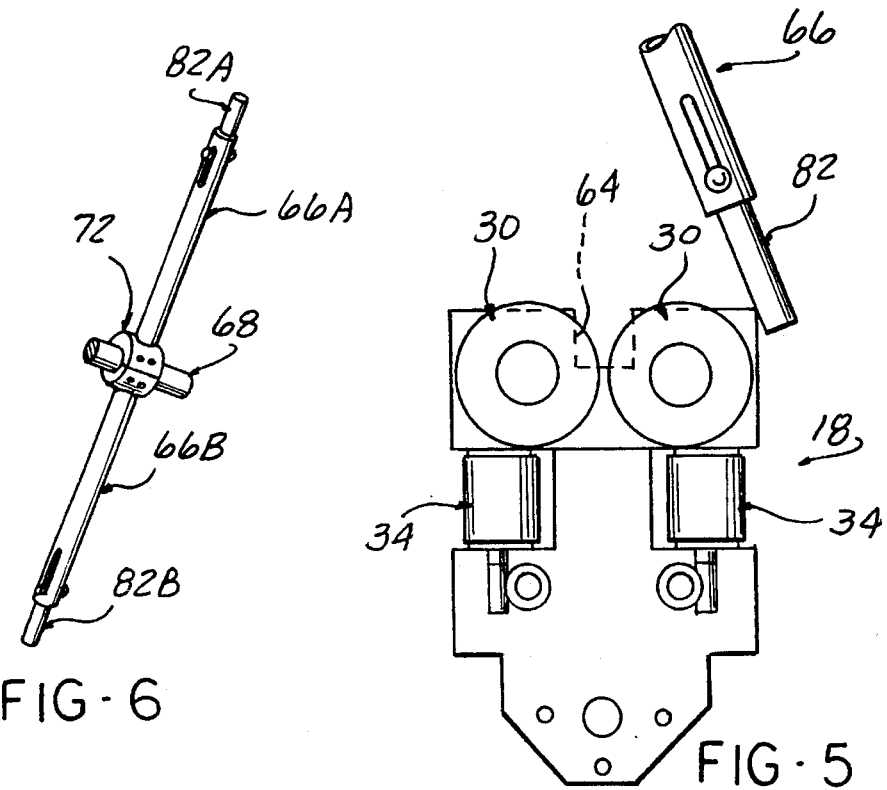
FIG-6
FIG-5

RETURN MECHANISM FOR GRAVITY CONVEYOR

FIELD OF THE INVENTION

This invention concerns conveyors and more particularly gravity conveyors of the type including a series of load carrying holder trolleys advanced along successive return and advance conveyor sections by inclination of the sections, and more particularly a return mechanism for returning the holder trolleys to an elevated position to reposition movement of the trolley holders along the gravity sections.

BACKGROUND DISCUSSION

There has heretofore been developed a gravity conveyor of the type including upper and lower return and advance inclined guideway sections, each supporting load holding trolleys which roll from one end of each section of the guideway successively to the opposite end. The holders are driven to an elevated position above an unload end of the inclined lower section for gravity return along the upper section to the load end of the conveyor section via a radiused track at the lower end of the upper section.

It is sometimes desirable that such conveyors be used as "accumulators" in which a series of the trolleys is allowed to queue up at the unload end enabling a stock piled or "float" quantity of parts at the unload end of the conveyor lower section. Such queuing has created problems in the mechanism used to elevate the trolleys to the upper end of the return section of the conveyor since reliable engagement with an individual trolley is rendered more difficult by the presence of the other queued trolleys.

Accordingly, it is an object of the present invention to provide a trolley return drive mechanism for such gravity conveyors in which the individual trolleys are reliably engaged notwithstanding the presence of other queued trolleys presented for return to the upper return section of the conveyor.

SUMMARY OF THE INVENTION

This and other objects of the present invention which will become apparent upon a reading of the following specification and claims is achieved by a trolley return mechanism comprised of one or more engagement rod assemblies mounted to a rotary hub driven by an electric motor. The outer end of each engagement rod assembly is being provided with a spring loaded plunger which, when the rod assembly is rotated, sweeps through the queuing location whereat the trolleys queue up for return. Each trolley is formed with a notched recess in the top portion thereof. The spring loaded plunger is retracted as it sweeps over the top surface of the holders until moving into registry with the engagement recess of the leading trolley. The plunger is spring-extended into the recess to establish a driving engagement, causing the leading trolley to be swept along a radiused return track to be delivered in an inverted state onto the upper return run of the gravity conveyor sections.

In the event there is only a single trolley at the return loading location, the side of the plunger engages the trailing side edge of the single trolley which is thereby drivingly engaged for advance along the radiused track section to be deposited at the beginning of the return section of the gravity conveyor.

A plurality of the return rod assemblies, each equipped with a spring loaded plunger, may be employed to increase the number of trolleys able to be returned per shaft revolution by the return mechanism.

DESCRIPTION OF THE DRAWINGS

FIG. 4 is an enlarged side elevational view of a pair of queued load holding trolleys, and a fragmentary view of the drive rod assembly shown in phantom in a succeeding position.

FIG. 5 is a side elevational view of a single load holding trolley showing a drive rod assembly plunger in engagement therewith.

FIG. 6 is a perspective view of a dual drive rod assembly of a double drive rod configuration used in an alternate embodiment of the drive mechanism according to the present invention.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
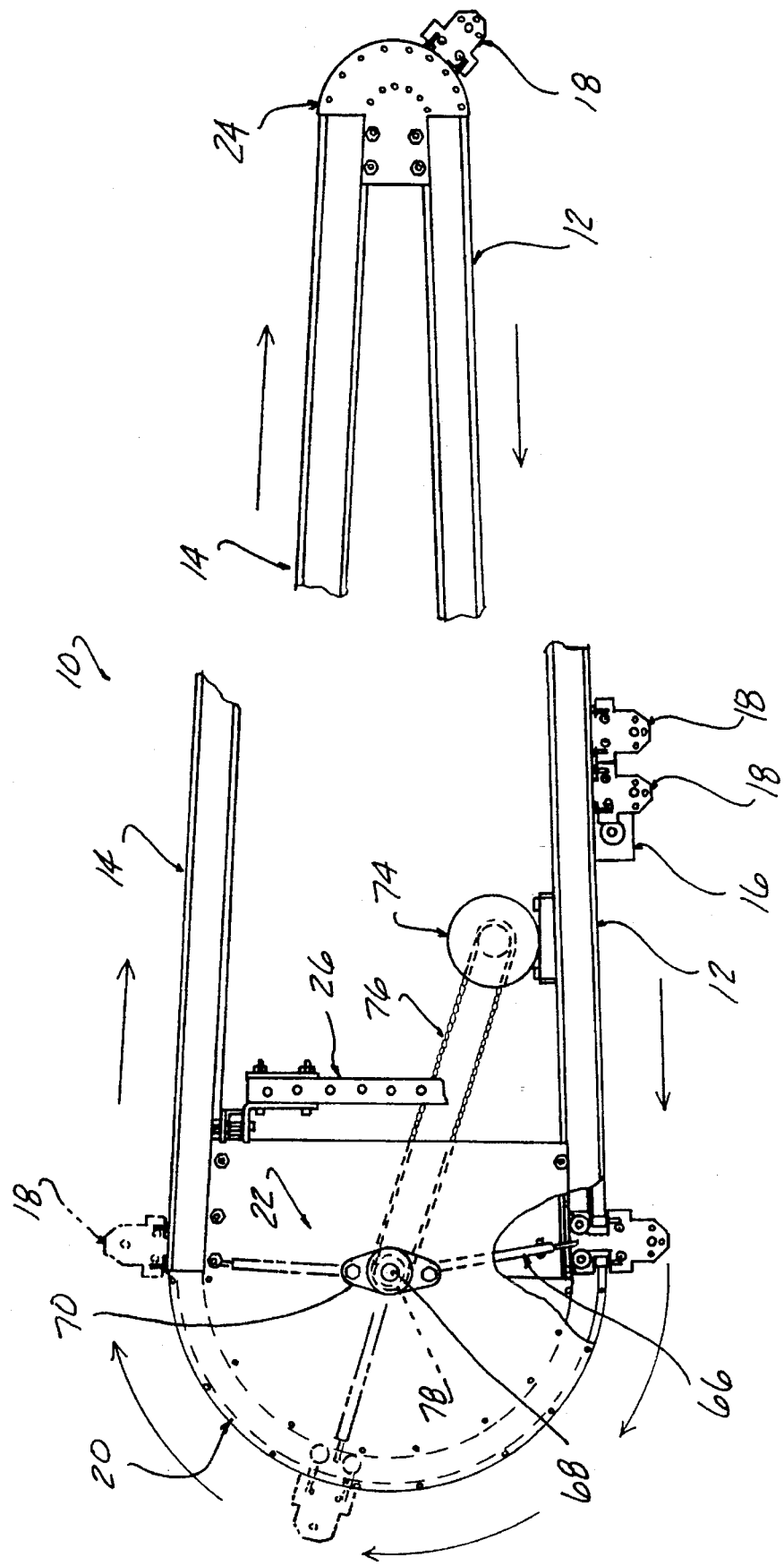
FIG. 1 is a fragmentary side-elevational view, partially broken away, of a gravity conveyor equipped with the return drive mechanism according to the present invention.

Referring to the drawings and particularly FIG. 1, a gravity conveyor 10 is shown including an inclined advancing lower section 12 and a return upper section 14. The lower advancing section 12 is inclined downwardly from right to left, i.e., from a loading point to an unloading point, which may be defined by a stop mechanism 16 controlled to extend a plunger into the path of the trolley and stop its movement. The return section 14 is inclined downwardly from the left to the right as viewed in FIG. 1.

A series of load supporting trolleys 18 descend by gravity down the length of the advance section 12 from right to left as viewed in FIG. 1, around curved track 20 at the left end, forced therearound by a transfer mechanism 22 according to the present invention, and descend from left to right down the return conveyor section 14 and pass around, by gravity, end track structure 24 to be received into the lower advancing section 12.

The conveyor is typically supported for overhead location as by a framework 27, only a small portion of which being shown in FIG. 1. Each of the conveyor sections 12, 14 comprise an aluminum extrusion defining a lower rolling surfaces 26 adjacent an open slot 28 enabling the trolleys 18 to roll therealong by means of a pair of spaced support rollers 30 rotatably mounted on the upper part of the trolley 18.

A tail portion 32 projects through the slot 28 and is suitably configured to provide engagement with load holding hooks, etc., not shown. A pair of guide rollers 34 mounted for rotation about a vertical axis are fit within the slot 28 which serve to absorb the transverse forces exerted thereon so as to allow relatively friction-free movement of the trolley 18 along the return and advance conveyor sections 12 and 14.

An upper wall defines upper surfaces 36 down which roll the support rollers 30 during the return movement down the return conveyor section 14. The return section 14 is formed from the same aluminum extrusion shape as the lower section 12, but in an inverted orientation.

Figure 3:
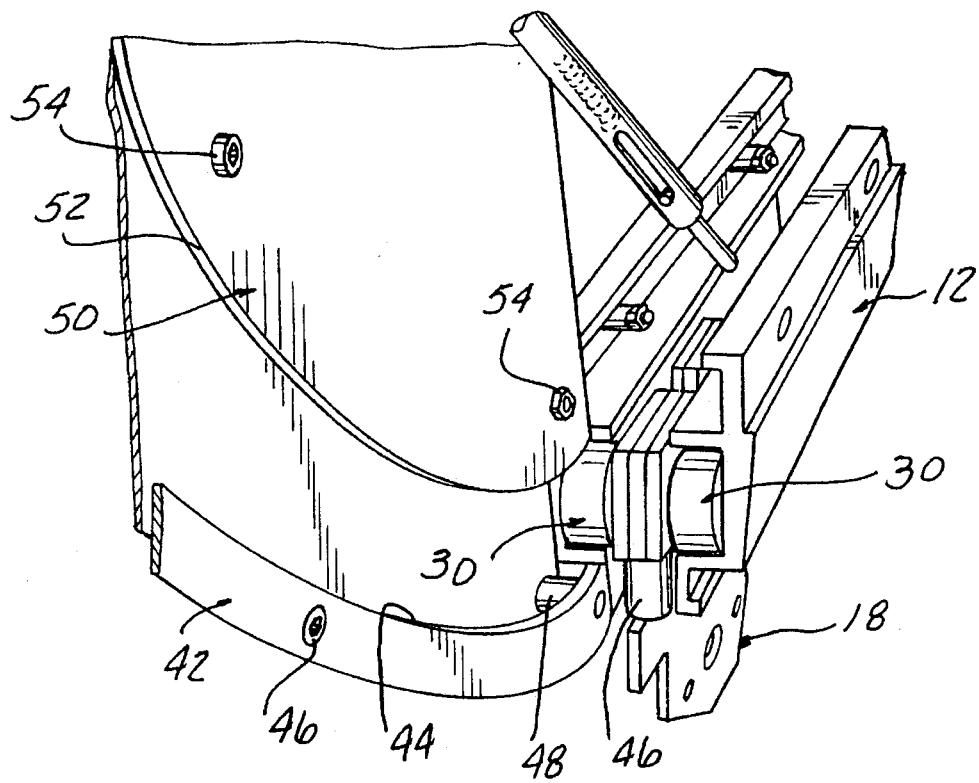
FIG. 3 is a fragmentary perspective view of a portion of the gravity conveyor shown in FIG. 1 with some of the components removed in order to show the connection between the advance conveyor lower section and the end return radiused track structures.

The extrusion shape also provides a pair of flanges 38 enabling attachment of various structures, including a pair of side plates 40 included in the end track structure 20. Attached to each of the side plates 40 is an outer curved guideway piece 42 on each side, only one shown in FIG. 3, each of which having an inner arcuate surface 44 which is aligned with the roller surfaces 26 such as to provide a radiused extension thereof.

The curved pieces 42 are attached to the end plates 40 by means of screws 46 and standoffs 48 such as to be spaced inwardly and aligned with the trolley support rollers 30 after passing off the lower conveyor section 12.

Also provided is an inner guide plate 50 attached to each side plate 40 and defining an arcuate roller surface 52 aligned with the upper guide roller surfaces 36, the inner guide plate 52 similarly attached with screws 54 and spacers (not shown).

FIG. 4 shows additional details of the trolley construction. FIG. 4 depicting two queued trolleys 18A, 18B. The trolleys 18A, 18B are preferably of a laminate plate design, including an upper spacer plate 56 providing additional support for the rollers 30, a main plate 58 having notches 60 for receiving the support pins for the guide rollers 34 secured by means of riveted fasteners 62.

Each of the trolleys 18A, 18B is provided with a central notched-out recess 64 provided in the top portion as an engagement feature for the drive return mechanism 22. The drive mechanism 22 includes a drive rod assembly 66 clamped to a rotary shaft 68 supported in a bearing assembly 70 on either side of respective end plates 40, and attached by means of a split collar 72.

An electric motor 74 is mounted atop the lower conveyor section 12, and a chain drive 76 and sprocket 78 enables powered rotation of the shaft 68 to cause the drive rod assembly 66 to sweep around the track defined by the surfaces 44 of curved guide pieces 42 and surfaces 52 of guide plates 50.

The drive rod assembly 66 includes a fixed inner tube 80 slidably receiving a spring loaded plunger 82. A compression spring 84 is mounted within the tube 80 and urges the plunger 82 to an extended position. A pin 86 extends outwardly into a slot 88 in the tube 80 limiting the outer travel of the plunger 82. As the shaft 68 rotates, the plunger 82 is normally extended. The outermost position of the plunger 82 is such as to engage a side surface 89 on the rear or trailing side of each trolley 18.

If there is not a queued trolley 18A to the rear of the trolley located beneath the shaft 68, the trailing side of the trolley is immediately engaged by the side of the plunger 82 of rod assembly 66. In this event, the rotation of the shaft 68 and sweeping movement of the rod assembly 66 causes the trolley to be moved around and upwardly to be deposited on the return conveyor section 14 for gravity return to the righthand side of the conveyor.

In the event there is one or more queued trolleys 18A to the rear of the trolley 18B, the plunger 82 engages the upper surface 90 and is retracted as the rod assembly 66 rotates past the trolleys 18A, 18B until reaching the recess 64 of the lead trolley 18B, at which time the plunger 82 is extended such as to be received into the recess 64. This establishes a driving engagement such that the trolley 18B is driven along the tracks defined by the end track structure 20 to be deposited onto the return conveyor section 14 as before.

Additional drive rod assemblies 66A, 66B as shown in FIG. 6 can be provided in opposing orientation such as to balance the loading of the shaft 68 and to provide an increased frequency of transfer from the lower to upper conveyor sections for each revolution of the shaft 68. Additional sets of drive rod assemblies also may be provided.

It can be appreciated that a relatively simple mechanism has been provided which has been found to operate reliably in engaging either single or accumulated trolleys for transfer between the conveyor sections.

I claim:

1. In a gravity conveyor including upper and lower inclined sections connected at one end with a first radiused track, connected at their other ends more widely spaced apart vertically with a second radiused track, larger sized than said first radiused track, and a plurality of trolleys having support rollers enabling said trolleys to roll down said upper section, around said first radiused track and down said lower section, a return mechanism for returning said trolleys from a lower end of said lower conveyor section around said second radiused rack to an upper end of said upper conveyor section, said return mechanism comprising:

a shaft mounted for rotation about the center of said second radiused track;

a drive motor rotating said shaft;

at least one rod assembly affixed to said shaft and extending radially outward to said second track;

said rod assembly including a spring-loaded plunger at the outer end adapted to be retracted against a spring force urging said plunger outwardly;

each of said trolleys including a recess in an upper portion thereof with said trolley on said lower conveyor section, said recess adapted to receive a tip of said plunger as said rod assembly rotates across a trolley disposed at said lower end of said lower conveyor section;

extension of said tip into said recess thereby establishing a driving engagement of said rod assembly with said trolley to cause said trolley to be swept around said second track by rotation of said shaft and deposit said trolley onto said upper end of said upper conveyor section.

2. The gravity conveyor according to claim 1 wherein said drive mechanism further comprises a plurality of rod assemblies mounted to said shaft.

3. The gravity conveyor according to claim 1 wherein said second radiused track includes a pair of side plates, a pair of outer arcuate pieces, each defining a radiused surface aligned with one of a pair of roller surfaces on said lower end of said lower conveyor section to define a roller track to receive said trolleys driven by said drive mechanism, and a pair of inner plates each defining an inner surface aligned with a respective one of a pair of roller surfaces on said upper end of said upper conveyor section, said inner surfaces supporting each of said trolleys as said trolleys become inverted in moving around said second radiused track and guiding said trolleys onto said upper track section.

4. The gravity conveyor according to claim 1 wherein said drive motor comprises an electric motor and a chain loop engaging a sprocket on an output shaft of said electric motor and a sprocket on said shaft of said drive mechanism.

5. The gravity conveyor according to claim 1 wherein each trolley has a trailing edge engaged by the side of said plunger if another trolley is not queued behind said trolley.

* * * * *

UNITED STATES PATENT AND TRADEMARK OFFICE
CERTIFICATE OF CORRECTION

PATENT NO. : 5,549,192
DATED : August 27, 1996
INVENTOR(S) : James Zaguroli, Jr.

It is certified that error appears in the above-indentified patent and that said Letters Patent is hereby corrected as shown below:

Column 2, line 64, "26" should be --27--.

Column 3, line 19, "26" should be --27--.

Column 4, line 31, "rack" should be --track--.

Figure 2:
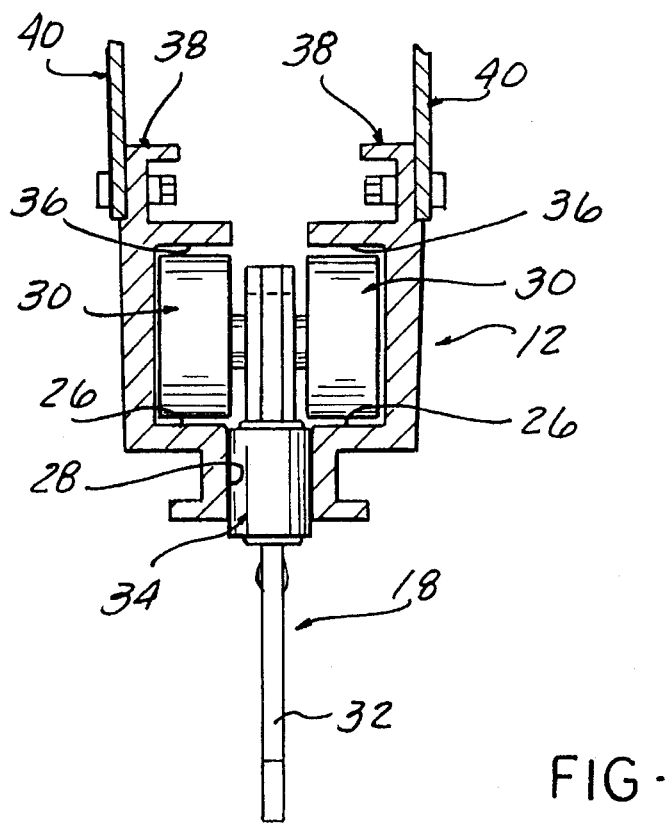
FIG. 2 is a transverse section view taken through the lower section of the gravity conveyor shown in FIG. 1.

In the Drawings
Figure 2, reference numeral "26" (two occurrences) should be --27--.

Signed and Sealed this

Seventeenth Day of December, 1996

Attest:

BRUCE LEHMAN

Attesting Officer        Commissioner of Patents and Trademarks